United States Patent [19]
Sakaguchi et al.

[11] Patent Number: 6,075,490
[45] Date of Patent: Jun. 13, 2000

[54] WINDOW GLASS FOR AUTOMOBILE AND WINDOW STRUCTURE OF AUTOMOBILE USING THE GLASS

[75] Inventors: Koichi Sakaguchi; Shigeki Nakagaki; Yasuto Sakai; Akihiro Hishinuma; Yukihito Nagashima, all of Osaka, Japan

[73] Assignee: Nippon Sheet Glass Co., Ltd., Osaka, Japan

[21] Appl. No.: 08/813,642

[22] Filed: Mar. 7, 1997

[30] Foreign Application Priority Data

| Mar. 7, 1996 | [JP] | Japan | 8-049746 |
| Nov. 26, 1996 | [JP] | Japan | 8-314614 |
| Dec. 11, 1996 | [JP] | Japan | 8-331122 |

[51] Int. Cl.[7] .............. B32B 17/00; B32B 3/00
[52] U.S. Cl. .............. 343/704; 343/711; 428/210
[58] Field of Search ............... 343/704, 713, 343/711, 712; 428/210

[56] References Cited

U.S. PATENT DOCUMENTS

| 4,282,021 | 8/1981 | Mazeau et al. | 65/30 R |
| 5,641,558 | 6/1997 | Noda et al. | 428/210 |
| 5,876,854 | 3/1999 | Kawazu et al. | 428/428 |

*Primary Examiner*—Don Wong
*Assistant Examiner*—James Clinger
*Attorney, Agent, or Firm*—Sughrue, Mion, Zinn, Macpeak & Seas, PLLC

[57] ABSTRACT

A window glass for an automobile and the window structure capable of clearly indicating visually warning by a high mounted stop lamp, etc., while having a heat-shielding function and a privacy protecting function are provided. A heat-shielding film is formed on the concave side (inside the automobile) of the window glass for an automobile, the film is partially removed or modified, and the visible light transmission of the removed or modified portion is increased to a predetermined value than the visible light transmission of other film-formed portion.

15 Claims, 4 Drawing Sheets

WINDOW GLASS FOR AUTOMOBILE AND WINDOW STRUCTURE OF AUTOMOBILE USING THE GLASS

FIELD OF THE INVENTION

The present invention relates to a window glass for an automobile and the window structure of an automobile using the glass, and more specifically to a window glass for an automobile having a heat-shielding function and a warning indicating function and the window structure of an automobile using the glass.

BACKGROUND OF THE INVENTION

As a window glass for an automobile, a heat-shielding glass for shielding heat which enters into an automobile from the outside to reduce the load for air-conditioning has been used. Also, as a window glass for an automobile, a glass for protecting privacy and further a colored glass from the point of design have been used.

Figure 7:
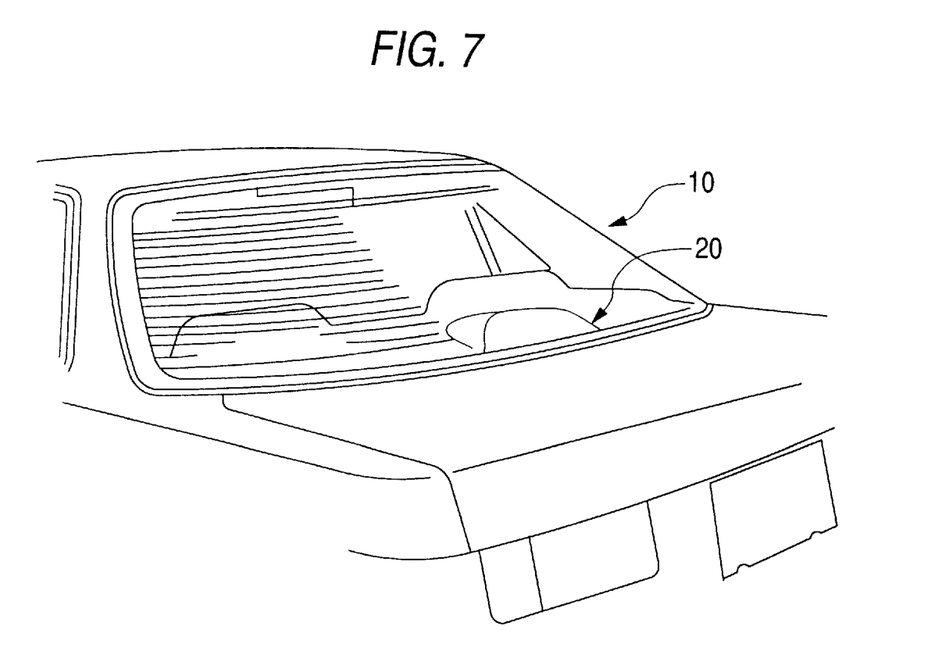
FIG. 7 is a slant view showing an example of a window structure (back window) of an automobile having HMSL.

On the other hand, for ensuring safety, a structure of indicating warning to the circumferences from the window glass of an automobile is frequently employed and in particular, in the back window of an automobile, a high mounted stop lamp (hereinafter, is referred to as "HMSL") 20 for letting the automobile located behind know the speed reduction or stopping of the automobile located ahead is frequently formed to the side thereof in the automobile as shown in FIG. 7. It is necessary that the HMSL is clearly recognized visually by the automobile behind, in particular, from the view point of avoiding a rear-end collision accident.

However, for sufficiently exhibiting the heat-shielding function and the privacy protecting function, it is better to use a glass which can restrain the visible light transmission of the window glass to some-extent, but for sufficiently exhibiting the warning indicating function, it is necessary to ensure the visible light transmission to some extent.

SUMMARY OF THE INVENTION

The object of the present invention is to provide a window glass for an automobile and the window structure of an automobile satisfying the requirements described above, which are conflict with each other.

The above object can be achieved by the present invention as described hereinbelow.

That is, according to the 1st aspect of the present invention, there is provided a window glass for an automobile having a glass plate, which is bent in conformity with the window of an automobile and has the concave surface in contact with the inside of the automobile and the convex surface in contact with the outside of the automobile, and a heat-shielding film formed on the surface of the glass plate, wherein the heat-shielding film is formed on the surface of the concave surface side described above and has a portion formed partially removing or modifying the heat-shielding film, the visible light transmission (percent indication) of the portion is 10 points or more higher than the visible light transmission of other film-formed potion except the portion. The visible light transmission as used herein means one measured with the CIE standard illuminant A.

According to the invention described in the 1st aspect of the present invention, there can be provided a window glass for an automobile sufficiently exhibiting both the heat-shielding function and the warning indicating function. That is, warning is indicated from the portion having a relatively high visible light transmission formed by partially removing or modifying the heat-shielding film and in other portion of the heat-shielding film having a relatively low visible light transmission than the foregoing portion, the entrance of heat is effectively restrained. Also, since the heat-shielding film having the heat-shielding function is formed on the concave surface in the inside of the automobile, the visible light reflectance at the surface of the glass plate of the outside of the automobile is lower than that of the case of forming the heat-shielding film at the outside of the automobile. The reduction of the visible light reflectance is particularly effective for the improvement of the visual recognition of warning indicated in the day time.

Also, according to the 2nd aspect of the present invention, there is provided a window glass for an automobile having a glass plate, which is bent in conformity with the window of an automobile and has the concave surface in contact with the inside of the automobile and the convex surface in contact with the outside of the automobile, and a heat-shielding film formed on the surface of the glass plate, wherein the heat-shielding film is formed on the surface of the concave surface side described above and has a portion formed partially removing or modifying the heat-shielding film, the visible light transmission of the portion is 50% or higher and the visible light transmission of other portion of the film except the foregoing portion is 40% or lower.

According to the invention described in the 2nd aspect of the present invention, there can be provided a window glass for an automobile sufficiently exhibiting both the heat-shielding function and the warning indicating function as the invention described in the 1st aspect of this invention. Warning is indicated from the portion having the visible light transmission of 50% or higher formed by partially removing or modifying the film, and in other portion of the heat-shielding film having the visible light transmission of 40% or lower, the entrance of heat is effectively restrained. Also, since the heat-shielding film having the heat-shielding function is formed on the concave surface in the inside of the automobile, the visible light reflectance is reduced and the visual recognition of warning is improved by the reason described above.

To make the visual warning clearly recognizable, it is preferred that the visible light transmission of the portion of the film formed by removing or modifying the heat-shielding film is 70% or higher. Also, for protecting privacy, the visible light transmission of other portion of the film except the foregoing portion is preferably 30% or lower and more preferably 20% or lower. In consideration of these situations, the difference of the visible light transmissions (percent indication) in the 1st aspect of this invention is preferably 20 points or more higher, and more preferably 30 points or more higher.

The portion formed by partially removing or modifying the heat-shielding film is usually formed such that the portion includes the portion of indicating warning. However, if the portion is excessively wide, the heat-shielding function is lowered. It is therefore preferred that the portion has the smallest size as long as it can include the warning indicating portion. Generally, the portion formed by partially removing or modifying the heat-shielding film has almost the same size as the indicating device disposed adjacent to the glass plate. For example, when HMSL is formed at the position adjacent to the glass plate in the automobile, it is preferred that the portion has almost the same size as the indicating portion of the HMSL.

As the glass plate for use in the present invention, a soda lime silica glass is usually used. As the soda lime silica glass, not only the colorless transparent glass but also the colored glass for controlling the visible light transmission or for giving a fine sight can be used. As jthe coloring component, there are titanium oxide ($TiO_2$), cerium oxide ($CeO_2$), cobalt oxide (CoO), selenium (Se), chromium oxide ($Cr_2O_3$), vanadium oxide ($V_2O_5$), nickel oxide (NiO), manganese oxide (MnO), etc. Also, the glass may be colored by increasing the concentration of iron oxides (FeO and $Fe_2O_3$) contained therein. In these components, since $TiO_2$m $CeO_2$, a nd $Fe_2O_3$ have ultraviolet absorbing properties, from the view points of preventing fading of interior decorations and preventing a sunburn, the glass plate containing the ultraviolet absorbing component described above is preferably used.

In addition, the convex surface and the concave surface of the glass plate show the surface form as a whole and even when the glass plate may be partially flat or may have partially reverse convex and concave forms (in particular, a wind shied or a back window sometimes has a portion becoming a concave form at the outside of an automobile in the portion near the lower end thereof and has an S-form in the cross section), if the form of the glass plate is a convex form or a concave form as a whole, the form of the glass plate corresponds to a convex surface or a concave surface.

Also, as the heat-shielding film, a so-called heat reflecting film which effects shielding by reflecting sun shine is mainly used but a film of shielding heat while having other functions such as privacy prevention, an ultraviolet absorption, design improvement by coloring, etc., may be used.

Also, according to the 3rd aspect of the present invention, there is provided a window glass for an automobile described in the 1st aspect or the 2nd aspect described above, wherein an electrically conductive filament is formed on the surface of the heat-shielding film described above as an antenna wire and/or a heating wire for defrosting.

Furthermore, according to the window glass for an automobile of the 3rd aspect of this invention, electric waves such as AM waves, FM waves, TV waves, etc., are received, and the frost formed on the surface of the glass plate due to attachment of minute water droplets can be removed by passing an electric current and thereby heating the wire.

The electrically conductive filament may be directly formed on the surface of the glass plate but taking into consideration a beautiful sight for the outside of the automobile, it is preferred to form the conductive filament on the heat-shielding film as described in the 3rd aspect of this invention. Where the conductive filament is formed in the manner described above, the existence of the heat-shielding film can make it hard to visually recognize the conductive filament from the outside of the automobile. In addition, even in the window glass for an automobile described in the 3rd aspect of this invention, when it is necessary to form the conductive filament on the portion formed by partially removing or modifying the film, the conductive filament at the portion is formed on the exposed surface of the glass plate.

According to the 4th aspect of the present invention there is provided a window glass for an automobile comprising a glass plate formed in conformity with the window of the automobile, a heat-shielding film formed on the surface of the glass plate, and an electrically conductive filament which is an antenna wire and/or a heating wire for defrosting, wherein the electrically conductive filament is formed on the heat-shielding film, the heat-shielding film has a portion formed by partially removed or modified, and the visible light transmission (percentage indication) of the portion is 10 points or more higher than the visible light transmission of film-formed portion except the foregoing portion.

Also, according to the 5th aspect of the present invention there is provided a window glass for an automobile having a glass plate formed in conformity with the window of the automobile, a heat-shielding film formed on the surface of the glass plate, and an electrically conductive filament which is an antenna wire and/or a heating wire for defrosting, wherein the electrically conductive filament is formed on the heat-shielding film, the heat-shielding film has a portion formed by partially removing or modifying the film, and the visible light transmission of the portion is 50% or higher, and the visible light transmission of other film-formed portion except the foregoing portion is 40% or lower.

According to the invention described in the 4th aspect or the 5th aspect of the present invention, the window glass for an automobile sufficiently exhibiting the heat-shielding function and the warning indicating function as the invention described in the 1st aspect or the 2nd aspect of this invention. Also, in each of these window glasses for an automobile, from the view point of mainly protecting the electrically conductive filament, the surface forming thereon the heat-shielding film and the conductive filament is usually used at the window portion of the inside of the automobile and in such a using embodiment, by the reduction of the visible light reflectance, the visual recognition of warning is improved and on the other hand, it becomes hard to visually recognize the conductive filament.

Each of the window glasses described in the 3rd aspect to the 5th aspect of this invention may be applied to the side windows, etc., of an automobile but is suitably applied to the back window of an automobile. This is because the back window has a relatively wide area and is frequently utilized for forming an antenna wire for receiving electric waves while the requirement of a heat refection is high, and further the back window is a portion where warning indicating means to the automobile behind, such as HMSL is frequently used.

According to the 6th aspect of the present invention, there is provided the window glass for an automobile described in the 1st aspect or the 2nd aspect of this invention, wherein the heat-shielding film is a film essentially composed of an oxide. In the film essentially composed of an oxide, the durability of the film is kept higher than films including nitride films, metal films, etc.

Also, according to the 7th aspect of the present invention, there is provided the window glass of an automobile described in the 6th aspect, wherein the film essentially composed of an oxide is a film composed of an oxide of metals including cobalt.

In this case, the film essentially composed of an oxide is preferably a film composed of an oxide of at least one kind of a metal selected from a group consisting of cobalt, iron, chromium, nickel, tin, antimony, and titanium, and more specifically, a film composed of an oxide of a metal including cobalt, a film composed of titanium oxide as the main component, and a film composed of the oxide of tin and antimony as the main component are preferred. In the case of requiring a sufficiently low visible light transmission, the film composed of the oxide of the metals including cobalt as described in the 7th aspect of this invention is preferred. To these films may be properly added silicon, aluminum, zinc, copper, indium, bismuth, vanadium, manganese, zirconium, etc., in addition to the metal described above for reducing the reflectance and finely adjusting the tint.

According to the 8th aspect of the present invention, there is provided the window glass for an automobile described in the 6th aspect or the 7th aspect, wherein the heat-shielding film is a film formed by a thermal decomposition method on the surface of a glass ribbon produced by a float process. Since the method of continuously forming an oxide film by a thermal decomposition method on the surface of a glass ribbon produced by a float process can utilize the remaining heat of the glass melt for the formation of the film, the method is a preferred film-forming method in production efficiency.

According to the 9th aspect of the present invention, there is provided the window glass for an automobile described in the 6th aspect, wherein the heat-shielding film is a film containing at least one kind of fine particles for coloring selected from gold, silver, platinum, palladium, cadmium sulfide, and cadmium selenide.

Also, as the film essentially composed of the oxide described above, the film containing at least one kind of fine coloring particles selected from gold, silver, platinum, palladium, cadmium sulfide, and cadmium selenide can be suitably used. The film can be formed into a colored film having each of various transparent colors of from red to blue by suitably incorporating silicon oxide, titanium oxide, cerium oxide, etc., to the film and further, the visible light transmission of the film can be properly lowered by incorporating the oxide of at least one metal selected from the group consisting of cobalt, chromium, copper, manganese, nickel, and iron.

According to the 10th aspect of the present invention, there is provided the window glass for an automobile described in one of the 1st aspect to the 9th aspect described above, wherein the portion formed by removing or modifying the film forms a mark such as a character or letter, a figure, a sign, etc. According to the window glass for an automobile, an arbitrary form such as the automobile name of the automobile, the house mark of the manufactured company, etc., can be shown on the glass, which makes possible the indication of information to the outside of an automobile and the addition of an additional value of the appearance. As described above, in the window glass for an automobile of the present invention, the portion of the film where the visible light transmission is partially improved can be utilized not only for warning to the automobile behind but also for indicating other general information.

According to the 11th aspect of the present invention, there is provided the window glass for an automobile descried in one of the 1st aspect to the 10th aspect described above, wherein the surface resistance of the heat-shielding film is $10^4$ $\Omega/\square^2$ or higher.

According to the window glass for an automobile of the 11th aspect, the receiving and sending performance of a communication equipment such as a portable telephone, etc., being used in the automobile are stabilized.

According to the 12th aspect of the present invention, there is provided the window glass for an automobile described in the 11th aspect, wherein the surface resistance of the heat-shielding film is $10^5$ $\Omega/\square^2$ or higher. In the window glass for automobile of the 12th aspect, lowering of the receiving faculty of the antenna is prevented. For further improving the receiving faculty of the antenna, it is generally preferred that the surface resistance of the heat-shielding film is $10^6$ $\Omega/\square^2$ or higher although it depends upon the form of the antenna pattern.

According to the 13th aspect of the present invention, there is provided the window glass for an automobile described in one of the 1st aspect to the 12th aspect described above, wherein the transmission of the portion formed by removing or modifying the heat-shielding film at a wavelength of 710 nm is 50% or higher. In the window glass for an automobile, the transmission thereof in a red wavelength region of a visible light region is partially ensured high and the window glass is particularly suitable in the window structure of the automobile being used as a combination with a red light emitting means (e.g., a high luminance lamp covered with a red plastic film or red LED), which is frequently used for HMSL. The transmission described above is preferably 60% or higher.

According to the 14th aspect of the present invention, there is provided a window structure of an automobile equipped with a window glass for an automobile and a warning indicating means to the outside of the automobile, the window glass having a glass plate, which is bent and has the concave surface in contact with the inside of the automobile at the window of the automobile and the convex surface in contact with the outside of the automobile, and a heat-shielding film formed on the concave surface of the glass plate, wherein in the window glass for an automobile, the heat-shielding film formed on the concave surface has a portion formed by partially removing and modifying the heat-shielding film, the visible light transmission (percent indication) of the portion is 10 points or more higher than the visible light transmission of other film-formed portion except the portion, and the warning indicating means is a means of indicating warning with light transmitted through the portion formed by partially removing or modifying the heat-shielding film.

According to the 15th aspect of the present invention, there is provided a window structure of an automobile equipped with a window glass for an automobile and a warning indicating means to the outside of the automobile, the window glass having a glass plate, which is bent and has the concave surface in contact with the inside of the automobile at the window of the automobile and the convex surface in contact with the outside of the automobile, and a heat-shielding film formed on the concave the surface of the glass plate, wherein in the window glass for an automobile, the heat-shielding film formed on the concave surface has a portion formed by partially removing and modifying the heat-shielding film, the visible light transmission of the portion is 50% or higher, the visible light transmission of other film-formed portion except that portion is 40% of lower, and the warning indicating means is a means indicating warning with light transmitted through the portion formed by partially removing or modifying the heat-shielding film.

According to the 16th aspect of the present invention, there is provided a window structure of an automobile having a window glass for an automobile, which is formed in conformity with the windows of the automobile, has a heat-shielding film formed thereon, and an electrically conductive filament which is an antenna wire and/or a heating wire for defrosting, and a warning indicating means to the outside of the automobile, wherein in the window glass for an automobile, the electrically conductive filament is formed on the heat-shielding film, the heat-shielding film has a portion formed by partially removing or modifying the heat-shielding film, the visible light transmission (percent indication) of the portion is 10 point s or more higher than the visible light transmission of other film-formed portion except the portion, and the warning indicating means is a means indicating warning with light transmitted through the portion formed by partially removing or modifying the heat-shielding film.

According to the 17th aspect of the present invention, there is provided a window structure of an automobile having a window glass for an automobile and a warning indicating means to the outside of the automobile, the window glass for an automobile having a glass plate formed in conformity with the windows of the automobile, a heat-shielding film formed on the glass plate, and an electrically conductive filament which is an antenna wire and/or a heating wire for defrosting, wherein in the window glass for an automobile, the electrically conductive filament is formed on the heat-shielding film, the heat-shielding film has a portion formed by partially removing or modifying the heat-shielding film, the visible light transmission of the portion is 50% or higher, the visible light transmission of other film-formed portion except the portion is 40% or lower, and the warning indicating means is a means indicating warning with light transmitted through the portion partially formed by removing or modifying the heat-shielding film.

In this case, there is no particular restriction on the warning indicating means and the means may be a direction indicating lamp but is preferably HMSL described above.

In addition, the window glass being used for each window structure described above may be the window glass for an automobile described in the 2nd aspect to the 13th aspect of the present invention.

DETAILED DESCRIPTION OF THE INVENTION

Then, the present invention is described in detail.

Figure 1:
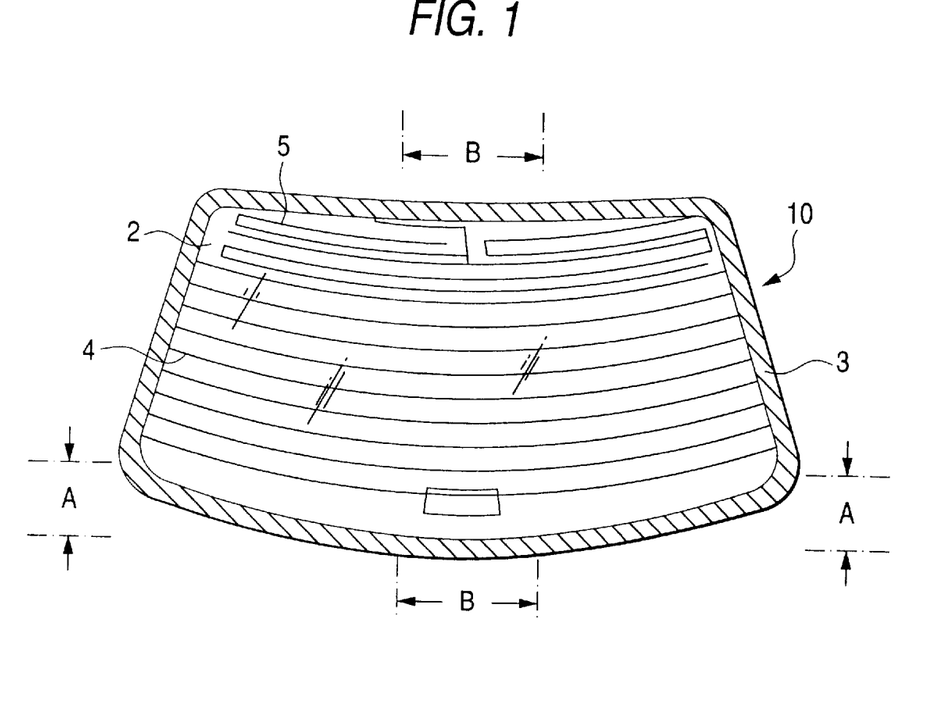
FIG. 1 is a plain view showing an example of the window glass for automobile of the present invention.
Figure 2:
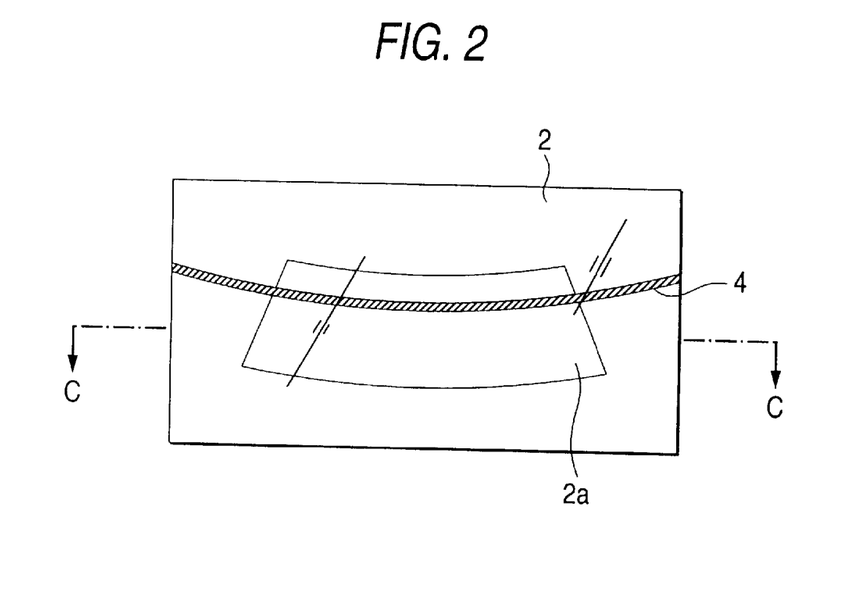
FIG. 2 is a partially enlarged view of the portion A–B in FIG. 1.
Figure 3:
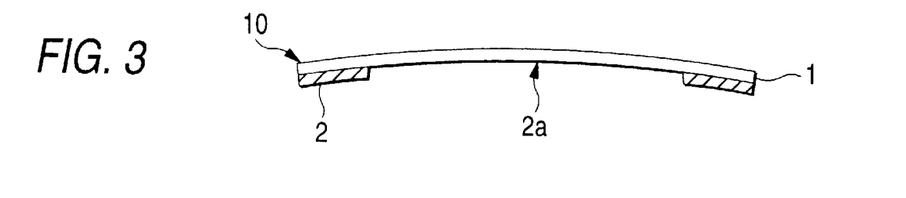
FIG. 3 is a cross-sectional view at C in FIG. 2, FIGS. 4(a)–(d) are views showing a method of forming a film on a part of the surface of a glass plate.

FIG. 1 is a plain view showing an example of the window glass for an automobile of the present invention and FIG. 2 is a partially enlarged view thereof. A part 2a of a heat-shielding film 2 formed on a glass plate is removed and in the portion formed by removing the film, the surface of the glass plate is exposed. As shown in FIG. 3 which is the cross-sectional view of FIG. 2, the heat-shielding film 2 is formed on the concave surface side of the bent glass plate 1. The portion 2a formed by partially removing the film is suitably formed at the portion corresponding to the HMSL indicating portion disposed in the inside of the automobile. The portion is generally formed at the lower center portion of the glass plate as shown in FIG. 1 but may be formed at an upper portion of the glass plate.

On the back window glass 10 for an automobile are formed heating wires 4 and antenna wires 5 each composed of electrically conductive filaments. A bus bar for feeding an electric current to the heating wires and a feeder for the antenna wires are concealed with a ceramic color 3 formed on the peripheral portion of the surface of the glass plate. These filaments or wires 4 and 5, as well as the heat-shielding film 2, are also formed on the concave surface side of the glass plate 1. The electrically conductive filaments 4 and 5 are formed on the heat-shielding film 2 but exceptionally, at the portion 2a formed by removing the film, the heating wire 4 is directly formed on the surface of the glass plate.

Figure 6:
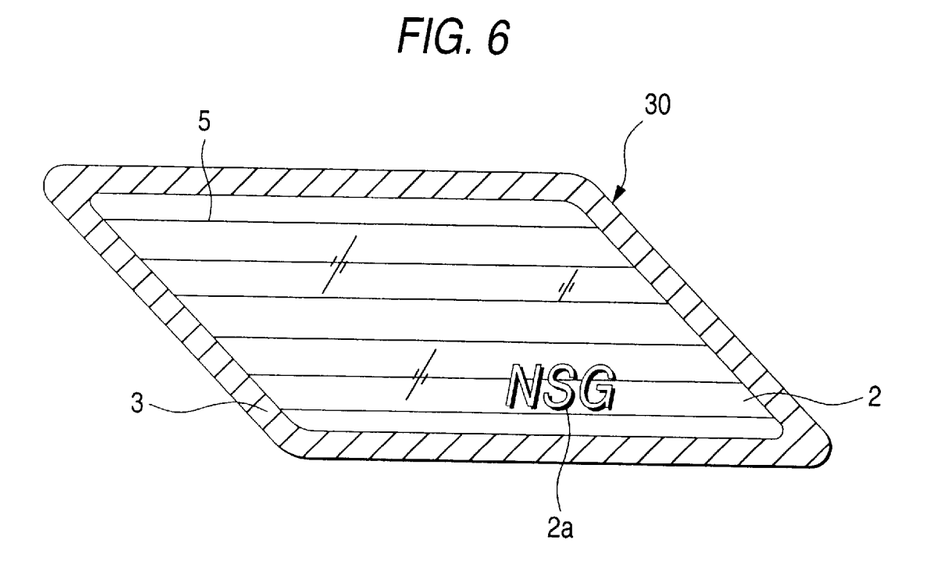
FIG. 6 is a plain view-showing an example of a window glass (side window glass) for an automobile indicating a character.

In addition, FIG. 6 shows an other example of the window glass for an automobile of the present invention and is a plain view showing the case of applying the present invention to a side window 30 for an automobile, which shows the case where the portion 2a formed by partially removing the heat-shielding film 2 is formed as letters. On the window glass 30 are also formed antenna wires 5. The antenna wires 5 are connected to each other by antenna wires formed at the peripheral portion of the glass (not shown since they are not seen by a ceramic color 3). In the case of FIG. 6, the antenna wires 5 are formed on a heat-shielding film 2.

Figure 4:
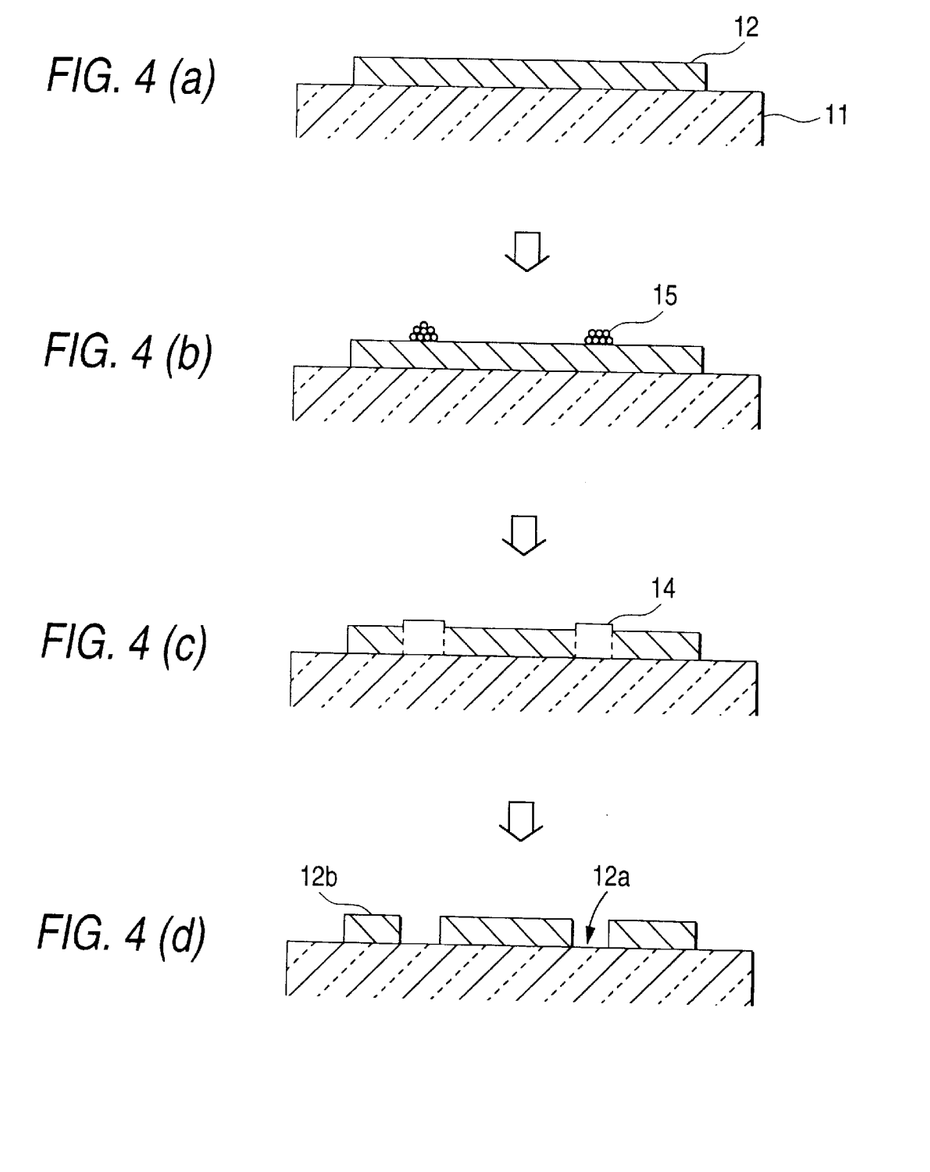

Then, an example of a method of forming the film on a part of the window glass is explained by FIG. 4.

On the surface of a glass plate 11 cut into a predetermined form is formed a heat-shielding film 12 composed of an oxide (a) and powders 15 of an inorganic compound are placed on predetermined portions of the film 12 (b). Then, they are heated to fluidize the powders 15 and the inorganic compound is contacted with the surface of the film in a molten state. The inorganic compound is melted together with the film and thus the film partially becomes a mixed state with the inorganic compound (c). Furthermore, the film is immersed in a liquid or washed with a liquid, whereby modified film portions 14 only are dissolved in the liquid and removed as shown 12a to partially form films 12b (d).

In FIG. 4, the bending step of the glass plate is omitted for simplicity. That glass plate 11 may be bent in any stage before or after a series of the steps described above but it is preferred to bend the glass plate during the steps and is, if necessary, tempered.

Figure 5:
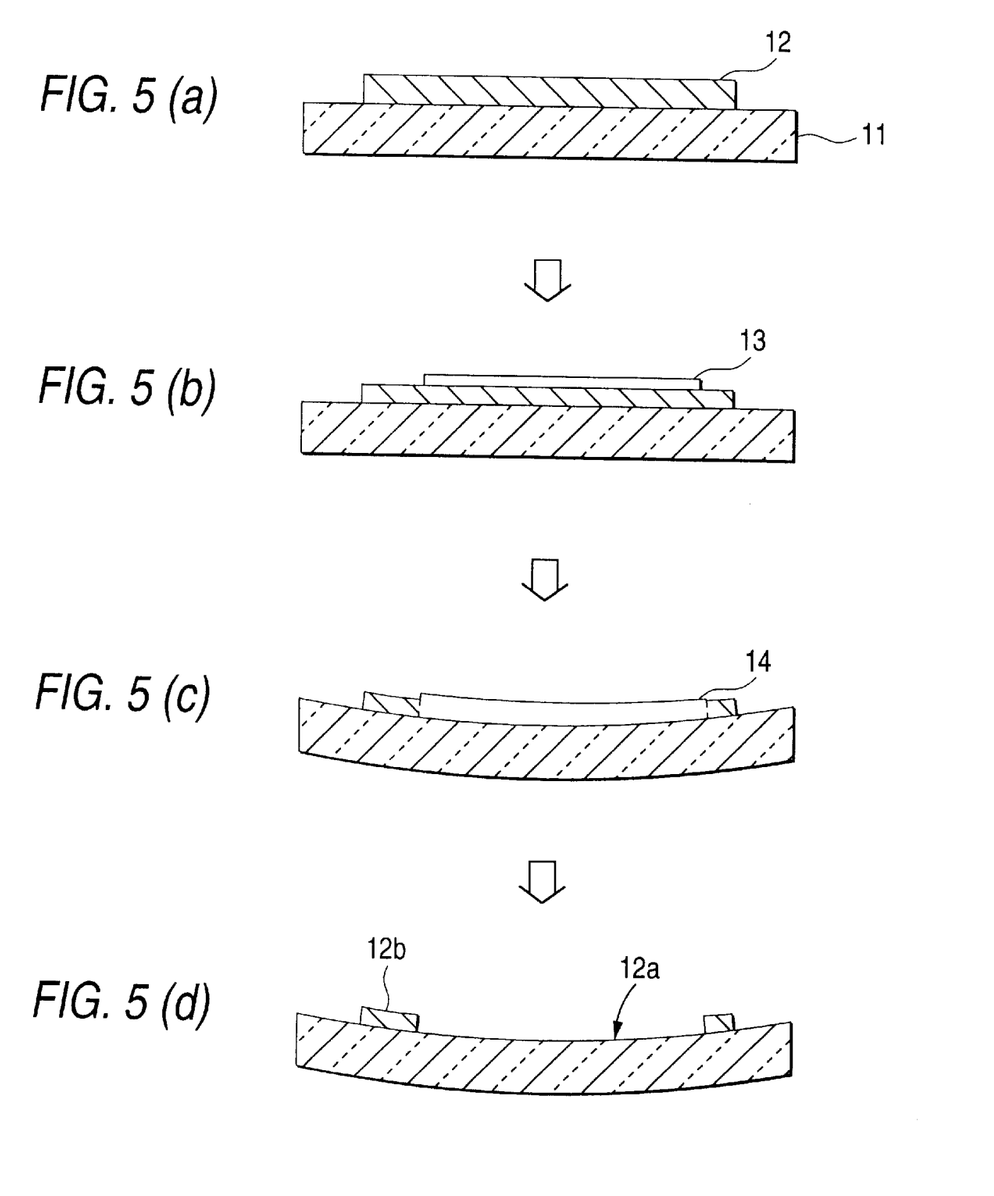
FIGS. 5(a)–(d) are views showing a method of forming a film on a part of the surface of a bent glass plate.

An example of such steps is explained by FIG. 5.

On the surface of a glass plate cut into a predetermined form is formed a heat-shielding film 12 composed of an oxide (a) and a pasty compound 13 prepared by adding an organic solvent to an inorganic compound is placed on a predetermined surface of the film 12 (b). Then, the glass plate 11 is heated to fluidize the paste 13 and the inorganic compound contained therein is contacted with the surface of the film in the molten state. The inorganic compound is melted together with the film and the film becomes a state of being partially mixed with the inorganic compound (c). Together with the step, a bending work is applied to the glass plate 11 softened by heating to make the glass plate a predetermined form. If necessary, the heated glass plate 11 is quenched to form a so-called tempered glass. Furthermore, the film is immersed in a liquid or washed-with a liquid and the modified film portion 14 only is dissolved in the liquid to remove the portion of the film, whereby film 12b is partially formed on the surface of the bent glass plate 11 (d).

As shown in FIG. 5, by utilizing the heating step in the case of melting the inorganic compound together with the film, tempering of the glass plate and/or the bending work of the glass plate can be practiced. As described above, the practice of melting of the film and the secondary work of the glass plate by the same heating step is advantageous in the production efficiency.

In addition, the powers 15 and the paste 13 in FIG. 4 and FIG. 5, respectively are not limited to them as will be described below.

As described above, the methods of forming the heat-shielding film on a part of the surface of the window glass for an automobile described in FIG. 4 and FIG. 5 are methods which include the step of forming the heat-shielding film on the surface of the glass plate such that the film includes the portions finally forming the film, the step of partially modifying the film by melting predetermined portion(s) of the heat-shielding film together with an inorganic compound to intermix the inorganic compound into a part of the heat-shielding film, and the step of dissolving the modified portion of the heat-shielding film in the liquid utilizing the partial difference in the solubility of the portion of the film formed by the modifying step and removing the dissolved film together with the liquid.

In this case, the final step of removing the film with the liquid can be omitted. That is, when the modified film portions 4 and 14 in the states of (c) in FIG. 4 and FIG. 5, respectively have a proper visible light transmission and a practical durability, these portions can be used as the state of (c) without removing these portions.

Also, in order to remove the film partially in FIG. 4 and FIG. 5, a means of melting a part of the film together with the inorganic compound is used, but the method of removing the film is not limited to it and, for example, the desired portions of the film may be partially dissolved off with a solution containing an appropriate inorganic compound.

As the inorganic compound described above, any inorganic compound can be used as long as it is basically a compound which can improve the solubility of an oxide constituting the film in a specific solvent by being melt with and incorporated into the oxide constituting the film or a compound which is capable of dissolving the oxide constituting the film in a solution state. The appropriate inorganic compound can be selected according to the film, etc. to be used. As a liquid for partially removing the film, various organic solvents such as alcohols may be used, but the use of water is preferred for simplicity of handling.

As the inorganic compound generally used in this invention, there are phosphoric acid compounds and boric acid compounds. More specifically, phosphoric acid ($H_3PO_4$), sodium dihydrogenphosphate ($NaH_2PO_4$) (typically, the dihydrate: $NaH_2PO_4 \cdot 2H_2O$), potassium dihydrogenphosphate ($KH_2PO_4$), boric acid ($H_3BO_3$), sodium tetraborate ($Na_2B_4O_7$) (typically, deca-hydrate: $Na_2B_4O_7 \cdot 10H_2O$), etc., can be used.

As the inorganic compound, a glass may be used. As the glass, a glass containing phosphorus oxide ($P_2O_5$), boron oxide ($B_2O_3$), zinc oxide (ZnO), lead oxide (PbO), or bismuth oxide ($Bi_2O_3$) is preferred. Specifically, the glass composition of $R_2O$—$P_2O_5$ system, $R_2O$—$B_2O_3$ system, PbO—$B_2O_3$—ZnO system, PbO—$SiO_2$—$B_2O_3$ system, $Bi_2O_3$—ZnO—$B_2O_3$ system, $R_2O$—ZnO—$SiO_2$—$B_2O_3$ system, ZnO—$B_2O_3$ system, $R_2O$—ZnO—$P_2O_5$ system, etc., (wherein R represents an alkali metal such as Na or K) can be suitably used.

In the case of melting a part of the film together with the inorganic compound, the inorganic compound can be selectively contacted with a part of the film by the following method.

(1) Powders or granules containing the inorganic compound are placed on a part of the surface of the film.

(2) A paste prepared by mixing the inorganic compound and an organic solvent is coated on a part of the surface of the film.

(3) A solution having dissolved or dispersed therein the inorganic compound is coated on a part of the surface of the film and if necessary, the surface of the film is dried.

After contacting the inorganic compound with a part of the surface of the film by the method typified by one of the methods (1) to (3) described above, the glass plate is generally heated (as the case may be, the circumference only of the inorganic compound is heated) to melt the inorganic compound. Before melting, usually, the powders, the granules, the paste, etc., are fluidized and attached to the surface of the film. In this case, without using such a heating step, the inorganic compound previously melted by heating may be selectively brought into contact with a part of the surface of the film.

Taking into consideration the thermal efficiency in the heating step as described above, it is preferred that the melting point of the inorganic compound is generally low and, for example, when a glass plate is used as the substrate, it is required that the melting point of the inorganic compound is lower than at least the softening point of the glass (e.g., 735° C. in the case of using soda lime glass as the glass substrate). In addition, when a glass is used as the inorganic compound, it is required that the softening point of the glass is lower than the softening point of the glass constituting the substrate. The melting point of the inorganic compound or the softening point of the glass being used as the inorganic compound is preferably 500° C. or lower, more preferably 350° C. or lower, and most preferably 200° C. or lower.

In addition, in the case of dissolving off a part of the film with a solution, the method (3) described above wherein the drying step is omitted may be used. In the case of using the method, phosphoric acid is suitable as the inorganic compound.

As the method of forming the film composed of the oxide, a sputtering method, a vacuum vapor deposition method, a liquid-phase film-forming method, a thermal decomposition method, etc., can be used.

The thermal decomposition method is a method of forming the film of an oxide on the surface of a substrate by thermally decomposing and oxidizing a raw material compound on the surface of a glass plate having a high temperature and practically includes a method of coating a metal compound on the surface of a base material followed by burning, a method of sending the vapor of a metal compound onto the surface of a substrate heated at a high temperature (CVD method), a method of spraying a solution or a dispersion prepared by dissolving or dispersing a metal compound in an organic solvent or water as minute liquid droplets (spray method), etc. Also, as a typical liquid-phase film-forming method, there is a so-called sol-gel method.

Examples of the method of forming the electrically conductive filaments include a method of printing a predetermined pattern with a paste containing silver by means of screen printing, and heating and burning it.

Then, the present invention is described in more detail by the following examples.

EXAMPLE 1

A soda lime silica glass (visible light transmission 81%) having a thickness of 3.4 mm and a green color as the substantial color was washed and dried to provide a substrate. The substrate was fixed by a hanging means and kept in an electric furnace of 650° C. for 5 minutes. After taking out the substrate, onto the surface of the substrate was sprayed a raw material solution obtained by dissolving 12.5 g of dipropionylmethane of trivalent cobalt, 0.62 g of acetyl acetonate of trivalent iron, and 1.83 g of acetyl acetonate of chromium in 100 ml of toluene using a commercially available spray gun under the conditions of an air pressure of 3.0 kg/cm$^2$, an air amount of 90 liters/minute, and a spraying amount of 20 ml/minute. The weight percentages of cobalt, iron, and chromium to the total metal amounts per unit area of the heat-reflecting film obtained by an inductively coupled plasma atomic emission spectrometry (hereinafter referred to as "ICP analysis") were 84%, 6%, and 10%, respectively.

Then, a mixture of sodium dihydrogenphosphate-(dihydrate) (NaH$_2$PO$_4$.2H$_2$O, melting point 60° C.) and an organic solvent as a thickener ("EX5000", trade name, made by Okuno Seiyaku K. K.) at 1:1 by weight ratio was coated on a part (the area corresponding to the indicating portion of HMSL) of the surface of the film at a thickness of about 10 μm. Thereafter, the substrate thus coated was kept in an electric furnace kept at a temperature of 200° C. for 3 minutes to evaporate the organic materials, furthermore, the heat-shielding glass was heated in a bending and tempering furnace to 650° C. to apply a bending work and the glass was quenched by blowing thereto a compressed air to apply thereto a tempering treatment. In addition, the bending work was applied such that the surface of the substrate having the film became a concave surface.

When the heat-reflecting glass after the treatment was observed, it was seen that the film formed by coating the mixture described above had a raster and a part of the film was modified. The visible light transmission of the portion was 63%. When the film was washed with warm water, the modified portion of the film was completely removed to partially expose the glass surface.

When each of the visible light transmissions of the film-removed portion and the film-remaining portion were measured, the visible light transmission of the film-removed portion was 81% and the visible light transmission of the film-remaining portion was 31%. Also, the light transmission of the film-removed portion at a wavelength of 710 nm was 64%.

Also, the resistance of the film measured was 2×10$^6$ Ω/□$^2$.

When the film-removed portion of the heat-reflecting glass thus bent and tempered was placed near to the indicating portion of HMSL emitting a red color and observed from the convex surface of the glass, the indication was very clearly confirmed through the film-removed portion.

In addition, by following the same procedure as above except that calcium metaphosphate (Ca(PO$_3$)$_2$, melting point: 975° C.) was used in place of sodium dihydrogenphosphate as the inorganic compound, the partial removal of the heat-reflecting film was tried. However, calcium metaphosphate was sintered only on the film and the partial modification and removal of the film could not be practiced.

EXAMPLE 2

When the formation of the film and the treatment were practiced by the same manners as Example 1 except that potassium dihydrogenphosphate (KH$_2$PO$_4$, melting point 96° C.) was used in place of sodium dihydrogenphosphate as the inorganic compound, a heat-reflecting film could be partially formed as in Example 1. The visible light transmission was 81% for the film-removed portion and 31% for the film-remaining portion. In addition, the visible light transmission of the film-modified portion before removing the film was 69%.

EXAMPLE 3

A transparent soda lime silica glass (visible light transmission 88%) having a thickness of 6 mm was used as the substrate and as in Example 1, a raw material liquid obtained by dissolving 2.7 g of acetyl acetonate of trivalent cobalt, 0.6 g of dipropionylmethane of divalent nickel, and 0.3 g of acetyl acetonate of trivalent iron in 100 ml of toluene was sprayed onto the substrate under the conditions of an air pressure of 1.5 kg/cm$^2$, an air amount of 50 liters/minute and a spraying amount of 100 ml/minute for about 5 seconds. The weight percentages of cobalt, nickel, and iron to the total metal amounts per unit area of the heat-reflecting film obtained by an ICP analysis were 70%, 21%, and 9%, respectively.

Thereafter, by practicing patterning of the film as in Example 1, the heat-reflecting film was partially formed and the glass plate was bent and tempered. The visible light transmission was 87% for the film-removed portion and 37% for the film-remaining portion. Also, the light transmission of the film-removed portion at a wavelength of 710 nm was 79%. In addition, the visible light transmission of the film-modified portion before removing the film was 60%.

Also, the resistance of the film measured was 3.5×10$^4$ Ω/□$^2$.

EXAMPLE 4

By following the same procedure as Example 3 except that the same salt as used in Example 2 was used, a heat-reflecting film was partially formed. The visible light transmission was 87% for the film-removed portion and 37% for the film-remaining portion. In addition, the visible light transmission of the modified portion of the film before removing was 59%.

EXAMPLE 5

By following the same procedure as Example 1 except that boric acid (H$_3$BO$_3$, melting-point about 185° C.) was used in place of sodium dihydrogenphosphate as the inorganic compound, a heat-reflecting film was partially formed. The visible light transmission was 81% for the film-removed portion and 31% for the film-remaining portion. In addition, the visible light transmission of the film-modified portion before removing was 63%.

EXAMPLE 6

To a solution obtained by dissolving 100 g of sodium dihydrogenphosphate (dihydrate) (NaH$_2$PO$_4$•2H$_2$O, melting point 60° C.) in 200 g of water was added 100 g of ethanol. While sufficiently stirring the liquid, the liquid was sprayed onto a predetermined portion of the film on the same heat-reflecting glass as that prepared in Example 1 using a spray gun. Thereafter, patterning was practiced in the same manner as in Example 1. The visible light transmission was 81% for the film-removed portion and 31% for the film-remaining portion. In addition, the visible light transmission of the film-modified portion before removing was 63%.

EXAMPLE 7

By following the same procedure as Example 1 except that low-melting glass powder (softening point: about 300° C.) having a composition of PbO: 81%, ZnO: 4%, and B$_2$O$_3$: 15% by weight percentage was used in place of sodium dihydrogenphosphate as the inorganic compound, a heat-reflecting film was partially formed. The film was washed with hot water of 85° C. The visible light transmission was 81% for the film-removed portion and 31% for the film-remaining portion. In addition, the visible light transmission of the film-modified portion before removing was 63%.

EXAMPLE 8

A colorless soda lime silica glass having a thickness of 6 mm was used as a substrate and a solution obtained by mixing dibutyltin fatty acid $[(C_4H_9)_2Sn(OCOC_7H_{15})_2]$, toluene, xylene, isopropyl alcohol, and triphenylantimony was sprayed onto the substrate as a raw material liquid by a commercially available spray gun in the same manner as in Example 1. Thereafter, by following the same procedure as in Example 1, a heat-reflecting film composed of the oxides of tin and antimony as the main components was partially formed. The visible light transmission was 81% for the film-removed portion and 69% for the film-remaining portion.

Also, the resistance of the film measured was $2.4 \times 10^4$ $\Omega/\square^2$.

EXAMPLE 9

A colorless soda lime silica glass having a thickness of 6 mm was used as a substrate and a solution obtained by mixing titanium di-normalpropoxybisacetyl acetonate, toluene, and xylene was sprayed onto the substrate as a raw material liquid by a commercially available spray gun in the same manner as in Example 1. Thereafter, by following the same procedure as in Example 1, a heat-reflecting film composed of titanium oxide as the main component was partially formed. The visible light transmission was 81% for the film-removed portion and 62% for the film-remaining portion.

Also, the resistance of the film measured was $1.5 \times 10^6$ $\Omega/cm^2$.

EXAMPLE 10

A paste was prepared by mixing phosphoric acid ($H_3PO_4$, liquid at normal temperature) and the organic solvent used as a thickener in Example 1. The paste was coated on a part (the portion corresponding to the indicating portion of HMSL) of the surface of the same film as that prepared in Example 1 such that the thickness was about 10 μm. Thereafter, the substrate was subjected to a heat treatment by keeping it in an electric furnace kept at 200° C. for 5 minutes. After cooling, the paste coated was washed, and the paste-coated portion was completely removed. As a result, the heat-reflecting film could be partially formed. The resulting glass plate was subjected to the bending and tempering treatment in the same manner as in Example 1. The visible light transmission was 81% for the film-removed portion and 31% for the film-remaining portion. In addition, the visible light transmission of the film-modified portion before removing was 69%.

EXAMPLE 11

A solution prepared by adding dropwise 2 mols of acetyl acetone by a dropping funnel to 1 mol of titanium isopropoxide with stirring was used as a titanium oxide raw material liquid. Also, to 50 g of ethyl silicate were added 6 g of 0.1 N hydrochloric acid and 44 g of ethyl cellosolve, the mixture was stirred for 2 hours at room temperature, and the solution obtained was used as a silicon oxide raw material liquid. To 10 g of cerium nitrate hexa-hydrate was added 7.16 g of ethyl cellosolve, after raising the temperature of the mixture to 90° C. with stirring, the mixture was treated for one hour. The thus-obtained solution containing 23.2% $CeO_2$ as solid component was used as a cerium oxide raw material liquid. A liquid obtained by adding 9.00 g of ethyl cellosolve to 1 g of chloroauric acid tetra-hydrate was used a gold fine particle raw material liquid. Also, a liquid obtained by adding 18.8 g of ethyl cellosolve to 10 g of iron nitrate nona-hydrate was used as an iron oxide raw material liquid.

To 0.433 g of the iron oxide raw material liquid, 1.31 g of the titanium oxide raw material liquid, 1.41 g of the cerium oxide raw material liquid and 0.815 g of the silicon oxide raw material liquid was added 8.03 g of ethyl cellosolve, finally 3.00 g of the gold fine particle raw material liquid was added to the mixture, and the resultant mixture was mixed and stirred to provide a coating liquid.

A soda lime silica glass (visible light transmission 74%) having a thickness of 3.4 mm and a green color as the substantial color was washed and dried to provide a substrate and the coating liquid described above was coated on the substrate by spin coating at a rotation number of 1,000 rpm for 15 seconds. After air-dried, the substrate thus coated was heat-treated at 250° C. for 2 hours to deposit gold fine particles. Then, the substrate was burned at 720° C. for 105 seconds to form a film having a thickness of 210 nm and colored in a blue-green color on the glass plate.

The paste obtained by mixing phosphoric acid and the organic solvent which was used in Example 10 was coated on the colored film, the resulting glass plate was subjected to a heat treatment by keeping it in a furnace of 250° C. for 5 minutes, and after cooling, was washed. The paste-coated portion of the colored film was completely removed and the colored film could be partially formed. The visible light transmission was 74% for the film-removed portion and 27% for the film-remaining portion. Also, the light transmission at a wavelength of 710 nm was 52% for the film-removed portion and 28% for the film-remaining portion.

EXAMPLE 12

The raw material liquids were prepared and spin coating was carried out in the same manner as in Example 11. After air-dried, the glass plate thus coated was heat-treated at 250° C. for 2 hours and thus a film colored in a blue-green color having a thickness of 310 nm and having deposited gold fine particles was formed on a glass plate.

The paste obtained by mixing phosphoric acid and the organic solvent which was used in Example 10, was coated on the colored film, the resulting glass plate was subjected to a heat treatment by keeping it in a furnace of 125° C. for 5 minutes, and after cooling, was washed. The paste-coated portion of the colored film was completely removed. The glass plate was subjected to the bending and tempering treatment in the same manner as in Example 1. Thus, a colored film-attached tempered bent glass plate on which the colored film was partially formed was obtained. The thickness of the colored film after applying the bending and tempering treatment was 210 nm. The visible light transmission was 74% for the film-removed portion and 27% for the film-remaining portion. Also, the light transmission at a wavelength of 710 nm was 52% for the film-removed portion and 28% for the film-remaining portion.

In addition, the compositions of the colored films obtained in Examples 11 and 12 were Au: 16.1%, $SiO_2$: 18.2%, $TiO_2$: 24.2%, $CeO_2$: 36.6%, and $Fe_2O_3$: 4.9%.

EXAMPLE 13

A soda lime silica glass (visible light transmission 81%) having a thickness of 3.4 mm and a green color as the substantial color was used as a substrate, and a raw material liquid obtained by dissolving 7.44 g of acetyl acetonate of trivalent cobalt, 0.52 g of dipropionylmethane of divalent nickel, 1.87 g of acetyl acetonate of trivalent iron, and 1.83 g of acetyl acetonate of chromium in 300 ml of toluene was sprayed onto the substrate under the conditions of an air pressure of 1.5 kg/cm$^2$, an air amount of 50 liters/minute, and spraying amount of 100 ml/minute for about 5 seconds using a spray gun as in Example 1. The weight percentages of cobalt, iron, chromium, and nickel to the total metal amount per unit area of the heat-reflecting film obtained by an ICP analysis, cobalt were 59.0%, 18.5%, 22.0%, and 0.5%, respectively.

Thereafter, patterning of the film was practiced in the same manner as in Example 10, the heat-reflecting film was partially formed and thereafter, the glass plate was bent and tempered. The visible light transmission was 81% for the film-removed portion and 36% for the film-remaining portion. Also, the light transmission at a wavelength of 710 nm of the film-removed portion was 30%.

Also, the resistance of the film measured was $1.8 \times 10^6$ $\Omega/cm^2$.

EXAMPLE 14

A soda lime silica glass (visible light transmission 81%) having a thickness of 3.4 mm and a green color as the substantial color was used as a substrate, and a raw material liquid obtained by dissolving 7.12 g of acetyl acetonate of trivalent cobalt and 3.13 g of dipropionylmethane of divalent nickel in 300 ml of toluene was sprayed onto the substrate under the conditions of an air pressure of 1.5 kg/cm$^2$, an air amount of 50 liters/minute, and spraying amount of 100 ml/minute for about 5 seconds in the same manner as in Example 13. The weight percentages of cobalt and nickel to the total metal amount per unit area of the heat-reflecting film obtained by an ICP analysis were 73.8% and 26.2%, respectively.

Thereafter, patterning of the film was practiced as in Example 10, the heat-reflecting film was partially formed and thereafter, the glass plate was bent and tempered. The visible light transmission was 81% for the film-removed portion and 34% for the film-remaining portion. Also, the light transmission of the film-removed portion at a wavelength of 710 nm was 64%.

Also, the resistance of the film measured was $5.8 \times 10^3$ $\Omega/\square^2$.

On the surface of the concave side of each of the glass plates produced in Example 13 (the resistance of the film was $1.8 \times 10^6$ $\Omega/\square^2$) and Example 14 (the resistance of the film was $5.8 \times 10^3$ $\Omega/\square^2$) were formed heater wires and antenna wires in predetermined patterns with an electrically conductive paste (commercially available silver paste). Each window glass for an automobile thus obtained was mounted on the back window of an automobile and the antenna wire was connected to a radio receiver via a feeding terminal and a coaxial cable. When the antenna receiving faculty was tested in the state, in the antenna formed on the glass plate produced in Example 13, a good receiving state was obtained but in the antenna formed on the glass plate produced in Example 14, many noses occurred and the receiving state was inferior.

Also, in the examples described above, the film of the portions coated with the paste, etc., only was, modified and removed and when the coated portion was a predetermined form, it was confirmed that arbitrary letters, etc., could be formed on the glass plate as shown in, for example, FIG. 6.

According to the invention described in the 1st aspect or the 2nd aspect, the window glass for an automobile sufficiently giving the heat-shielding function and the warning indicating function can be provided. Also, the visible light reflectance of the glass surface at the outside of the automobile is reduced and visual recognizing property of warning is improved.

Furthermore, according to the invention described in the 3rd aspect, electric waves can be received and the conductive wire is hard to be visually recognized. Also, by the invention described in the 4th aspect or the 5th aspect of this invention, the same effects as described in the 3rd aspect can be obtained. Moreover, by the invention described in any one of the 14th aspect to the 17th aspect, the window structure giving the same effects as described above can be provided.

In addition, according to the invention described in the 6th aspect, the durability of the film is kept higher than a film including a nitride film, a metal film, etc., according to the invention described in the 7th aspect, the film having particularly reduced visible light transmission is provided, according to the invention described in the 8th aspect of this invention, the film preferable in the production efficiency is provided, and according to the invention described in the 9th aspect, the film having each of various transparent colors and a high design freedom is provided.

Furthermore, according to the invention described in the 10th aspect, not only warning but also other information can be indicated, according to the invention described in the 11th aspect, the receiving and sending faculty of the communication equipment used in the automobile is stabilized, according to the invention described in the 12th aspect, lowering of the receiving faculty of the antenna is prevented, and according to the invention described in 13th aspect, the emitted red light from the warning indicating means such as HMSL, etc., can be clearly recognized visually by the automobile behind, etc.

While the invention has been described in detail with reference to specific embodiments, it will be apparent to one skilled in the art that various changes and modifications can be made to the invention without departing from its spirit and scope.

What is claimed is:

1. A window glass for an automobile having a glass plate, which is bent in conformity with the window of the automobile and has the concave surface in contact with the inside of the automobile and the convex surface in contact with the outside of the automobile, and a heat-shielding film formed on the surface of the glass plate, wherein the heat-shielding film is formed on the surface of the concave surface side and has a portion formed by partially removing or modifying the heat-shielding film to form a stop lamp opening or a mark selected from the group consisting of a letter, figure, or sign, the visible light transmission of the removed or modified portion is at least 30 percentage points higher than the visible light transmission of the remaining heat-shielding film excluding the removed or modified portion, and the light transmission at a wavelength of 710 nm of the removed or modified portion is at least 50%.

2. A window glass for an automobile having a glass plate, which is bent in conformity with the window of the automobile and has the concave surface in contact with the inside of the automobile and the convex surface in contact with the outside of the automobile, and a heat-shielding film formed on the surface of the glass plate, wherein the heat-shielding film is formed on the surface of the concave surface side and has a portion formed by partially removing or modifying the heat-shielding film to form a stop lamp opening or a mark selected from the group consisting of a letter, figure, or sign, the visible light transmission of the removed or modified portion is at least 50% the visible light transmission of the remaining heat-shielding film excluding the removed or modified portion is 40% or lower, and the light transmission at a wavelength of 710 nm of the removed or modified portion is at least 50%.

3. The window glass for an automobile of claim 1 or 2, wherein electrically conductive filaments are formed on the surface of the heat-shielding film as an antenna wire and/or a heating wire for defrosting.

4. A window glass for an automobile having a glass plate, which is bent in conformity with the window of the automobile, a heat-shielding film formed on the surface of the glass plate, and an electrically conductive filament which is an antenna wire and/or a heating wire for defrosting, wherein the electrically conductive filament is formed on the heat-shielding film, the heat-shielding film has a portion formed by partially removing or modifying the heat-shielding film to form a stop lamp opening or a mark selected from the group consisting of a letter, figure, or sign, the visible light transmission of the removed or modified portion is at least 30 percentage points higher than the visible light transmission of the remaining heat-shielding film excluding the removed or modified portion, and the light transmission at a wavelength of 710 nm of the removed or modified portion is at least 50%.

5. A window glass for an automobile having a glass plate, which is bent in conformity with the window of the automobile, a heat-shielding film formed on the surface of the glass plate, and an electrically conductive filament which is an antenna wire and/or a heating wire for defrosting, wherein the electrically conductive filament is formed on the heat-shielding film, the heat-shielding film has a portion formed by partially removing or modifying the heat-shielding film to form a stop lamp opening or a mark selected from the group consisting of a letter, figure, or sign, the visible light transmission of the removed or modified portion is at least 50%, the visible light transmission of the remaining heat-shielding film excluding the removed or modified portion is 40% or lower, and the light transmission at a wavelength of 710 nm of the removed or modified portion is at least 50%.

6. The window glass for an automobile of claim 1, 2, 4 or 5, wherein the heat-shielding film is a film essentially composed of oxides.

7. The window glass for an automobile of claim 6, wherein the heat-shielding film is a film composed of the oxides of metals including cobalt.

8. The window glass for an automobile of claim 6, wherein the heat-shielding film is a film formed by a thermal decomposition method on the surface of a glass ribbon produced by a float process.

9. The window glass for an automobile of claim 6, wherein the heat-shielding film is a film containing at least one kind of fine particles for coloring selected from gold, silver, platinum, palladium, cadmium sulfide, and cadmium selenide.

10. The window glass for an automobile of claim 1, 2, 4 or 5, wherein the surface resistance of the heat-shielding film is at least $10^4$ $\Omega/\square^2$.

11. The window glass for an automobile of claim 10, the surface resistance of the heat-shielding film is at least $10^5$ $\Omega/\square^2$.

12. A window structure of an automobile equipped with a window glass for an automobile and a warning indicating device for indicating a warning to the outside of the automobile, said window glass for an automobile having a glass plate, which is bent and has the concave surface in contact with the inside of the automobile and the convex surface in contact with the outside of the automobile, and a heat-shielding film formed on the surface of the glass plate, wherein in the window glass for an automobile, the heat-shielding film formed on the surface of the concave side of the glass plate has a portion formed by partially removing or modifying the heat-shielding film to form a stop lamp opening or a mark selected from the ground consisting of a letter, figure, or sign, the visible light transmission of the removed or modified portion is at least 30 percentage points higher than the visible light transmission of the remaining heat-shielding film excluding the removed or modified portion, the light transmission at a wavelength of 710 nm of the removed or modified portion is at least 50%, and the warning indicating device indicates a warning by transmitting visible light through the removed or modified portion of the heat-shielding film.

13. A window structure of an automobile equipped with a window glass for an automobile and a warning indicating device for indicating a warning to the outside of the automobile, said window glass for an automobile having a glass plate, which is bent and has the concave surface in contact with the inside of the automobile and the convex surface in contact with the outside of the automobile, and a heat-shielding film formed on the surface of the glass plate, wherein in the window glass for an automobile, the heat-shielding film formed on the surface of the concave side of the glass plate has a portion formed by partially removing or modifying the heat-shielding film to form a stop lamp opening or a mark selected from the group consisting of a letter, figure, or sign, the visible light transmission of the removed or modified portion is at least 50%, the visible light transmission of the remaining heat-shielding film excluding the removed or modified portion is 40% or lower, the light transmission at a wavelength of 710 nm of the removed or modified portion is at least 50%, and the warning indicating device indicates a warning by transmitting visible light through the removed or modified portion of the heat-shielding film.

14. A window structure of an automobile equipped with a window glass for an automobile and a warning indicating device for indicating a warning to the outside of the automobile, said window glass for an automobile having a glass plate formed in conformity with the window of the automobile, a heat-shielding film formed on the surface of the glass plate, and an electrically conductive filament which is an antenna wire and/or a heating wire for defrosting, wherein in the window glass for an automobile, the electrically conductive filament is formed on the heat-shielding film, the heat-shielding film has a portion formed by partially removing or modifying the heat-shielding film to form a stop lamp opening or a mark selected from the group consisting of a letter, figure, or sign, the visible light transmission of the removed or modified portion is at least 30 percentage points higher than the visible light transmission of the remaining heat-shielding film excluding the removed or modified portion, the light transmission at a wavelength of 710 nm of the removed or modified portion is at least 50%, and the warning indicating device indicates a warning by transmitting visible light through the removed or modified portion of the heat-shielding film.

15. A window structure of an automobile equipped with a window glass for an automobile and a warning indicating device for indicating a warning to the outside of the automobile, said window glass for an automobile having a glass plate formed in conformity with the window of the automobile, a heat-shielding film formed on the surface of the glass plate, and an electrically conductive filament which is an antenna wire and/or a heating wire for defrosting, wherein in the window glass for an automobile, the electrically conductive filament is formed on the heat-shielding film, the heat-shielding film has a portion formed by partially removing or modifying the heat-shielding film to form a stop lamp opening or a mark selected from the group consisting of a letter, figure, or sign, the visible light transmission of the removed or modified portion is at least 50%, the visible light transmission of the remaining heat-shielding film excluding the removed or modified portion is 40% or lower, the light transmission at a wavelength of 710 mn of the removed or modified portion is at least 50%, and the warning indicating device indicates a warning by transmitting visible light through the removed or modified portion of the heat-shielding film.

\* \* \* \* \*